United States Patent
Minota

(10) Patent No.: US 11,226,458 B2
(45) Date of Patent: Jan. 18, 2022

(54) PLUGGABLE OPTICAL MODULE AND OPTICAL COMMUNICATION SYSTEM

(71) Applicant: NEC Corporation, Tokyo (JP)

(72) Inventor: Yuuji Minota, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/641,485

(22) PCT Filed: Aug. 8, 2018

(86) PCT No.: PCT/JP2018/029813
§ 371 (c)(1),
(2) Date: Feb. 24, 2020

(87) PCT Pub. No.: WO2019/044442
PCT Pub. Date: Mar. 7, 2019

(65) Prior Publication Data
US 2021/0165174 A1    Jun. 3, 2021

(30) Foreign Application Priority Data
Aug. 29, 2017    (JP) .............................. JP2017-164625

(51) Int. Cl.
*G02B 6/42* (2006.01)
*G02B 6/46* (2006.01)
(Continued)

(52) U.S. Cl.
CPC ......... *G02B 6/4246* (2013.01); *G02B 6/4216* (2013.01); *G02B 6/4256* (2013.01);
(Continued)

(58) Field of Classification Search
None
See application file for complete search history.

(56) References Cited

U.S. PATENT DOCUMENTS 5,898,812 A    4/1999   Vanoli
5,917,648 A *  6/1999   Harker ................ H01S 3/06704
                                                    359/341.3
(Continued)

FOREIGN PATENT DOCUMENTS

CN    101195453 A    6/2008
CN    101743496 A    6/2010
(Continued)

OTHER PUBLICATIONS

Communication dated Dec. 8, 2020 from The China National Intellectual Property Administration in Application No. 201880055795.2.

(Continued)

*Primary Examiner* — Andrew Jordan
(74) *Attorney, Agent, or Firm* — Sughrue Mion, PLLC

(57) ABSTRACT

In a pluggable optical module, to easily and compactly house an optical fiber for connecting optical components in a housing in which a plurality of optical components are mounted. A pluggable optical module includes a first optical fiber housing unit a second optical fiber housing unit, and a housing. The first optical fiber housing unit can house a first optical fiber connected to a first optical component. The second optical fiber housing unit can house a second optical fiber connected to a second optical component. The housing can house the first optical fiber housing unit and the second optical fiber housing unit. The pluggable optical module is configured to be capable of being inserted into and removed from an optical communication apparatus and the housing constitutes an outer shape of the pluggable optical module.

16 Claims, 14 Drawing Sheets

(51) Int. Cl.
  *H01S 3/067* (2006.01)
  *H01S 3/10* (2006.01)
  *H04B 10/40* (2013.01)

(52) U.S. Cl.
  CPC ............ *G02B 6/46* (2013.01); *H01S 3/06704* (2013.01); *H01S 3/10* (2013.01); *H04B 10/40* (2013.01)

(56) References Cited

U.S. PATENT DOCUMENTS

| | | | | |
|---|---|---|---|---|
| 5,920,668 | A * | 7/1999 | Uehara | H01S 3/06704 385/27 |
| 6,072,931 | A * | 6/2000 | Yoon | G02B 6/2558 385/135 |
| 6,275,639 | B1 * | 8/2001 | Bolt | G02B 6/4446 385/135 |
| 6,483,978 | B1 * | 11/2002 | Gao | H01S 3/06704 359/341.1 |
| 8,374,477 | B2 * | 2/2013 | Hill | G02B 6/46 385/135 |
| 8,660,398 | B2 * | 2/2014 | Abbiati | G02B 6/4446 385/135 |
| 9,164,230 | B2 * | 10/2015 | Zhu | G02B 6/036 |
| 9,711,929 | B1 | 7/2017 | Kim et al. | |
| 9,871,590 | B2 * | 1/2018 | Matsui | H01S 3/06754 |
| 10,502,909 | B2 * | 12/2019 | Minota | G02B 6/4292 |
| 10,578,802 | B2 * | 3/2020 | Minota | G02B 6/255 |
| 2002/0186952 | A1 * | 12/2002 | Gao | H01S 3/06704 385/135 |
| 2009/0136185 | A1 * | 5/2009 | Bayazit | G02B 6/4454 385/95 |
| 2009/0136195 | A1 * | 5/2009 | Smrha | G02B 6/4454 385/135 |
| 2016/0103286 | A1 | 4/2016 | Matsui | |
| 2018/0149814 | A1 * | 5/2018 | Minota | G02B 6/4278 |
| 2018/0156974 | A1 | 6/2018 | Minota | |
| 2020/0103605 | A1 * | 4/2020 | Minota | G02B 6/4246 |
| 2020/0174193 | A1 * | 6/2020 | Minota | G02B 6/3897 |
| 2021/0165174 | A1 * | 6/2021 | Minota | G02B 6/4246 |

FOREIGN PATENT DOCUMENTS

| | | |
|---|---|---|
| CN | 102201870 A | 9/2011 |
| CN | 102236141 A | 11/2011 |
| CN | 106687841 A | 5/2017 |
| JP | 10-079542 A | 3/1998 |
| JP | 2003-276950 A | 10/2003 |
| JP | 2016-081060 A | 5/2016 |
| JP | 2016-082590 A | 5/2016 |
| JP | 2016-082591 A | 5/2016 |
| WO | 2016/203683 A1 | 12/2016 |
| WO | 2016/203684 A1 | 12/2016 |

OTHER PUBLICATIONS

International Search Report for PCT/JP2018/029813 dated Nov. 6, 2018 [PCT/ISA/210].
English Translation of Written Opinion for PCT/JP2018/029813 dated Nov. 6, 2018 [PCT/ISA/237].
Chinese Office Action for CN Application No. 201880055795.2 dated Aug. 12, 2021 with English Translation.

* cited by examiner

PLUGGABLE OPTICAL MODULE AND OPTICAL COMMUNICATION SYSTEM

CROSS REFERENCE TO RELATED APPLICATIONS

This application is a National Stage of International Application No. PCT/JP2018/029813 filed Aug. 8, 2018, claiming priority based on Japanese Patent Application No. 2017-164625 filed Aug. 29, 2017.

TECHNICAL FIELD

The present invention relates to a pluggable optical module and an optical communication system.

BACKGROUND ART

In an optical communication system, an optical module used for communicating an optical signal (e.g. Patent Literature 1) is mounted. Among such optical modules, a pluggable optical module (e.g. SFP: Small Form-factor Pluggable, XFP: Ten (X) gigabit small Form-factor Pluggable, and CFP2: C Form-factor Pluggable 2) includes a plurality of optical components in a relatively narrow housing. Especially, the pluggable optical module used for digital coherent communication includes more optical components, and these optical components are connected by connecting optical fibers disposed in the housing (e.g. Patent Literatures 2 and 3).

CITATION LIST

Patent Literature

[Patent Literature 1] Japanese Unexamined Patent Application Publication No. H10-79542
[Patent Literature 2] Japanese Unexamined Patent Application Publication No. 2016-82591
[Patent Literature 3] Japanese Unexamined Patent Application Publication No. 2016-82590

SUMMARY OF INVENTION

Technical Problem

However, the inventor(s) has found that the pluggable optical module used for the above-described digital coherent communication has the following problems. In the pluggable optical module used for the digital coherent communication that has a transmission function and a reception function, various optical components such as a light source, a modulator, and a receiver, and optical components are connected by the optical fibers. Therefore, it is necessary to dispose a plurality of the optical components and a plurality of the optical fibers in the relatively narrow housing of the pluggable optical module whose dimensions are defined in the standard. Especially, in recent years, there is also a growing demand for mounting relatively large parts such as an EDFA (Erbium-Doped optical Fiber Amplifier) in the pluggable optical module to provide optical power of a transmission optical signal.

Although miniaturization of the optical components and high-density mounting of the optical components are required corresponding to progress of miniaturization of the pluggable optical module, this leads to more complication and more sophistication of design for housing the optical components and optical fibers in the housing and a fabrication process of the pluggable optical module.

Further, due to the sophistication of the optical component mounting in the housing of the pluggable optical module, it is necessary to dispose and fix the optical fibers in a narrow space between the optical components in the housing. However, since bending of the optical fiber is limited, when the optical fiber is bent beyond the limit, the optical fiber is broken. When trying to forcibly house the optical fiber in the housing, the optical fiber and the optical component interfere with each other, and thereby malfunctions such as damage or breakage of the optical fiber may be caused.

The present invention has been made in view of the aforementioned circumstances and, aims to easily and compactly house an optical fiber for connecting optical components in a housing in which a plurality of optical components are mounted in a pluggable optical module.

Solution to Problem

An aspect of the present invention is a pluggable optical module including: first optical fiber housing means configured to be capable of housing a first optical fiber connected to a first optical component; second optical fiber housing means configured to be capable of housing a second optical fiber connected to a second optical component; and a housing comprising a housing structure capable of housing the first optical fiber housing means and the second optical fiber housing means, in which the pluggable optical module is configured to be capable of being inserted into and removed from an optical communication apparatus and the housing constitutes an outer shape of the pluggable optical module.

An aspect of the present invention is an optical communication system including: a pluggable optical module configured to allow an optical fiber to be inserted thereinto or removed therefrom and configured to be capable of transmitting and receiving an optical signal through the optical fiber; and an optical communication apparatus configured to allow the pluggable optical module to be inserted thereinto or removed therefrom, in which the pluggable optical module includes: first optical fiber housing means configured to be capable of housing a first optical fiber connected to a first optical component; second optical fiber housing means configured to be capable of housing a second optical fiber connected to a second optical component; and a housing comprising a housing structure capable of housing the first optical fiber housing means and the second optical fiber housing means, in which the housing constitutes an outer shape of the pluggable optical module.

Advantageous Effects of Invention

According to the present invention, it is possible to easily and compactly house an optical fiber for connecting optical components in a housing in which a plurality of optical components are mounted in a pluggable optical module.

DESCRIPTION OF EMBODIMENTS

Figure 1:
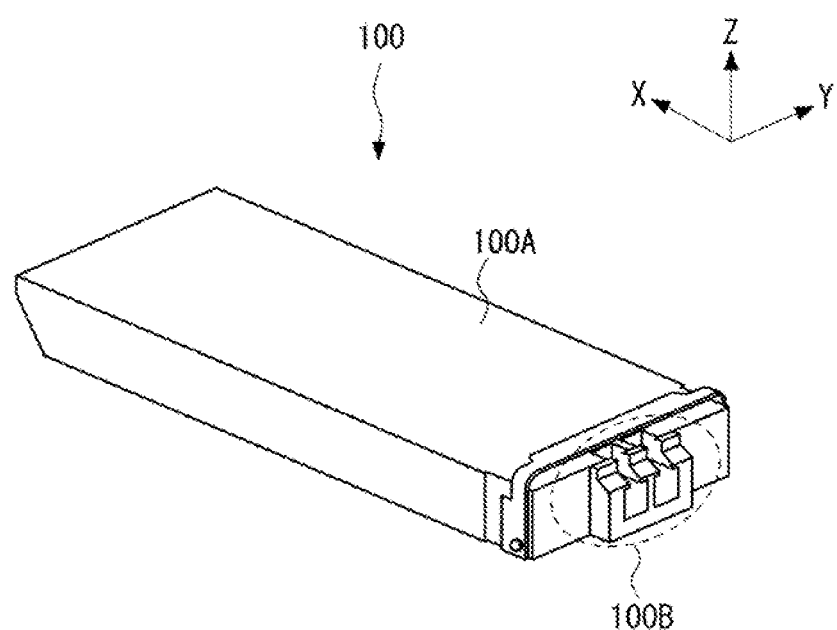
FIG. 1 is a perspective view of a pluggable optical module according to a first example embodiment viewed from a side of inlets of optical fibers.

Exemplary embodiments of the present invention will be described below with reference to the drawings. The same components are denoted by the same reference numerals throughout the drawings, and a repeated explanation is omitted as needed.

First Example Embodiment

A pluggable optical module 100 according to a first example embodiment will be described. The pluggable optical module 100 is configured to allow a connector of the optical fiber with connector to be inserted into and removed from the pluggable optical module 100. The pluggable optical module 100 is also configured to be capable of being inserted into and removed from an external optical communication apparatus, for example.

Figure 2:
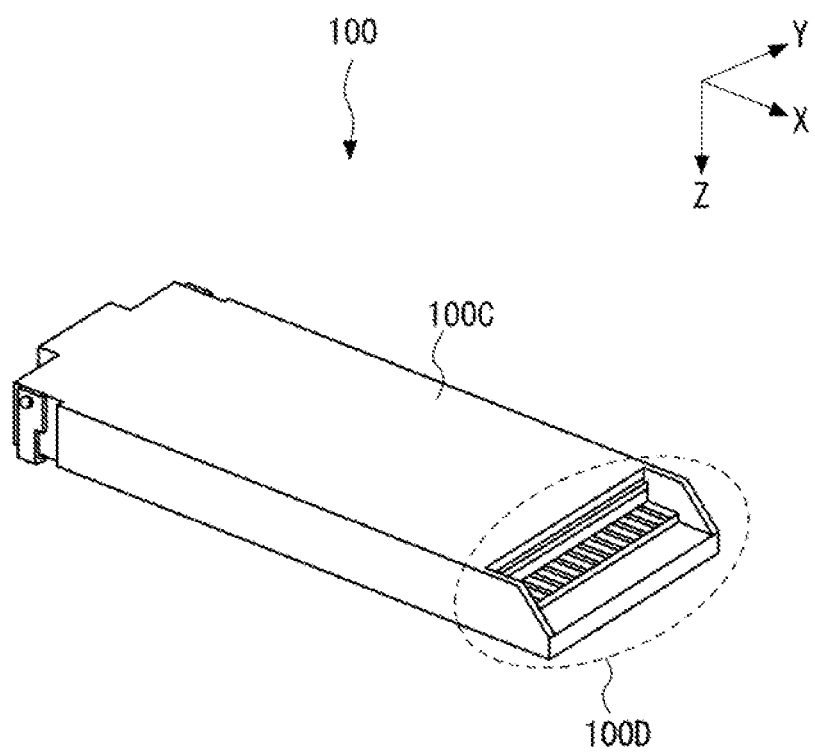
FIG. 2 is a perspective view of the pluggable optical module according to the first example embodiment viewed from a side of an optical communication apparatus.

Firstly, the appearance of the pluggable optical module 100 will be illustrated. FIG. 1 is a perspective view of the pluggable optical module 100 according to the first example embodiment viewed from a side of inlets of the optical fibers. A numerical sign 100A shown in FIG. 1 indicates an upper surface of the pluggable optical module 100. A numerical sign 100B shown in FIG. 1 indicates an insertion port of the connector of the optical fiber with connector. FIG. 2 is a perspective view of the pluggable optical module 100 according to the first example embodiment viewed from a side of the optical communication apparatus. A numerical sign 100C shown in FIG. 2 indicates a lower surface of the pluggable optical module 100. A numerical sign 100D shown in FIG. 2 indicates a connection part with the optical communication apparatus.

Figure 3:
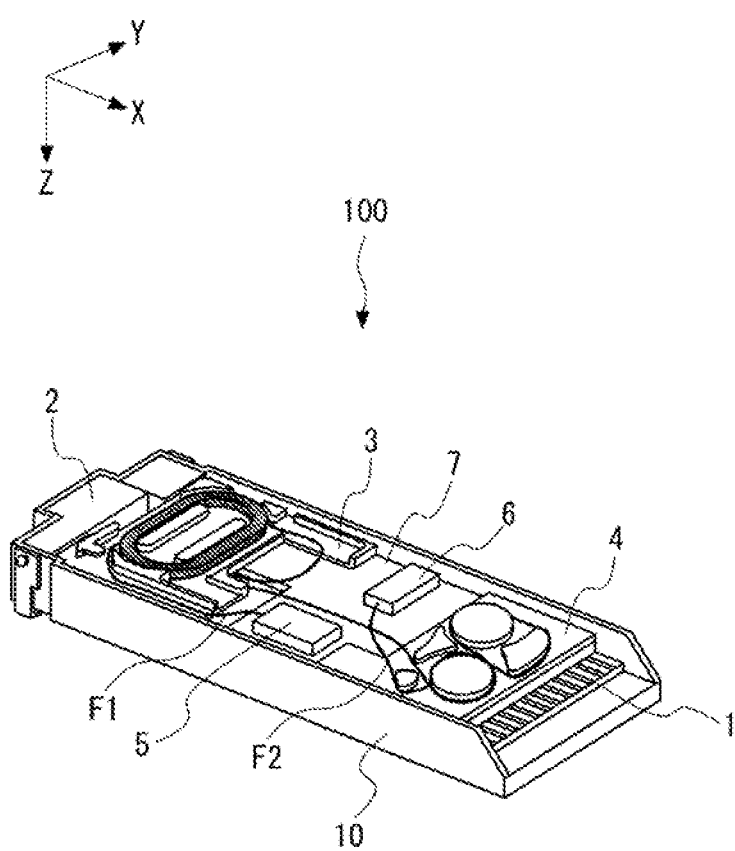
FIG. 3 is a perspective view schematically illustrating an example of an internal structure of the pluggable optical module according to the first example embodiment.

Next, a basic internal structure of the pluggable optical module 100 will be described. FIG. 3 is a perspective view schematically illustrating an example of the internal structure of the pluggable optical module 100 according to the first example embodiment. FIG. 3 illustrates the internal structure of the pluggable optical module 100 when the cover of the lower surface of a housing 10 (referred with the numeral sign 100C in FIG. 2) is removed and the pluggable optical module 100 is viewed from the side of the optical communication apparatus.

As illustrated in FIG. 3, various optical components and printed circuit boards are disposed in the housing 10 providing the outer shape of the pluggable optical module 100. The optical components disposed in the housing 10 are connected by the optical fibers. An optical fiber housing unit is also disposed as optical fiber housing means to house extra lengths of the optical fibers wound in the housing 10.

In the example of FIG. 3, a printed circuit board 7 is housed in the housing 10. Although not illustrated in the drawings, the various optical components may be mounted on an upper surface (a surface of a Z+ side) of the printed circuit board 7. An optical component 5 (also referred to as a first optical component) and an optical component 6 (also referred to as a second optical component) are disposed below (or in a Z– side of) the printed circuit board 7. The optical components 5 and 6 include various optical components such as a light source, an optical modulator, an optical transceiver, a pluggable electric connector, a pluggable optical receptor, an erbium-doped optical fiber amplifier (EDFA) and also the optical components mounted on the printed circuit board 7. In the example of FIG. 3, the pluggable electric connector 1 and the pluggable optical receptor 2 are represented as specific examples of interface components.

An optical fiber housing unit 3 (also referred to as a first optical fiber housing unit or first optical fiber housing means) and an optical fiber housing unit 4 (also referred to as a second optical fiber housing unit or second optical fiber housing means) are configured as a plate-like member, and are housed in a side of lower surface (a part in the Z– side) in the housing 10. The optical fiber housing unit 3 is disposed to house an extra length of an optical fiber F1 connecting the optical component 5 and the pluggable optical receptor 2 serving as the other optical component. The optical fiber housing unit 4 is disposed to house an extra length of an optical fiber F2 connecting the optical component 6 and the pluggable optical receptor 2 serving as the other optical component.

Each of the optical fiber housing units 3 and 4 is configured in such a manner that a part of a side surface thereof contacts an internal surface of the housing 10 and the contact part is fixed to the housing 10, and thereby positions of the optical fiber housing units 3 and 4 are fixed.

For example, the side surfaces of the optical fiber housing units 3 and 4 may have a shape of a step structure or a hollow structure capable of being fitted to the internal surface of the housing 10 and may be fitted by the such structure capable of being fitted. In this case, a structure corresponding to the shapes of the side surfaces of the optical fiber housing units 3 and 4 is also formed on the housing 10. Additionally, for example, the optical fiber housing units 3 and 4 may have through holes, the housing 10 may have screw holes, and the optical fiber housing units 3 and 4 may be fixed to the housing 10 by screwing the screws into the through holes and the screw holes. It should be appreciated that the fixing method of the optical fiber housing units 3 and 4 is not limited to the screws, and various fixing methods may be used.

Thus, the extra lengths of the optical fibers F1 and F2 are housed in the optical fiber housing units 3 and 4, respectively. Therefore, it is possible to prevent the optical fibers F1 and F2 passing through the optical fiber housing units 3 and 4 from interfering with other optical components or the printed circuit board 7. As a result, the breakage of the optical fibers F1 and F2 can be prevented. Hereinafter, the optical fiber F1 is also referred to as a first optical fiber and the optical fiber F2 is also referred to as a second optical fiber.

In this example, as illustrated in FIG. 3, in the housing 10, the optical fiber housing units 3 and 4 are arranged below (or in the Z– side of) the other optical components or the printed circuit board 7 on which the other optical components are mounted. In this case, it is desirable that the optical fiber housing units 3 and 4 are arranged in such a manner that the surfaces of the optical fiber housing units 3 and 4 on which the optical fibers are housed do not face the other optical components and the printed circuit board 7. Thus, since it is possible to more accurately prevent the optical fibers F1 and F2 from interfering with the other optical components or the printed circuit board 7, the breakage of the optical fibers F1 and F2 can be more accurately prevented.

FIG. 3 is merely an example and the direction of the surfaces of the optical fiber housing units 3 and 4 on which the optical fibers of are housed may be upward (Z+ side) or downward (Z– side) as long as the breakage of the optical fibers can be prevented. Further, the direction of the surface of the printed circuit board on which the optical components or the like are mounted may be upward (Z+ side) or downward (Z– side) as long as the breakage of the optical fibers can be prevented.

The internal structure of the pluggable optical module 100 illustrated in FIG. 3 is simplified for easy understanding, and the internal structure is not limited to this example. Although the optical components 5 and 6 are given as examples of the optical components in FIG. 3, these are merely examples. One or more optical components other than optical components 5 and 6 may be disposed in the housing 10, and positions thereof may be in the upper side (Z+ side) or in the lower side (Z– side) of the printed circuit board 7. Although the printed circuit board 7 is given as an example of the printed circuit board in FIG. 3, this is merely an example. One or more printed circuit boards other than the printed circuit board 7 may be disposed in the housing 10. Further, one or more optical fibers connecting between the optical components in the housing 10 other than the optical fibers F1 and F2 may be disposed. The optical fiber housing unit 3 may house not only the optical fiber F1 but also one or more optical fibers including the optical fiber F2 other than the optical fiber F1. The optical fiber housing unit 4 may house not only the optical fiber F2 but also one or more optical fibers including the optical fiber F1 other than the optical fiber F2.

Figure 4:
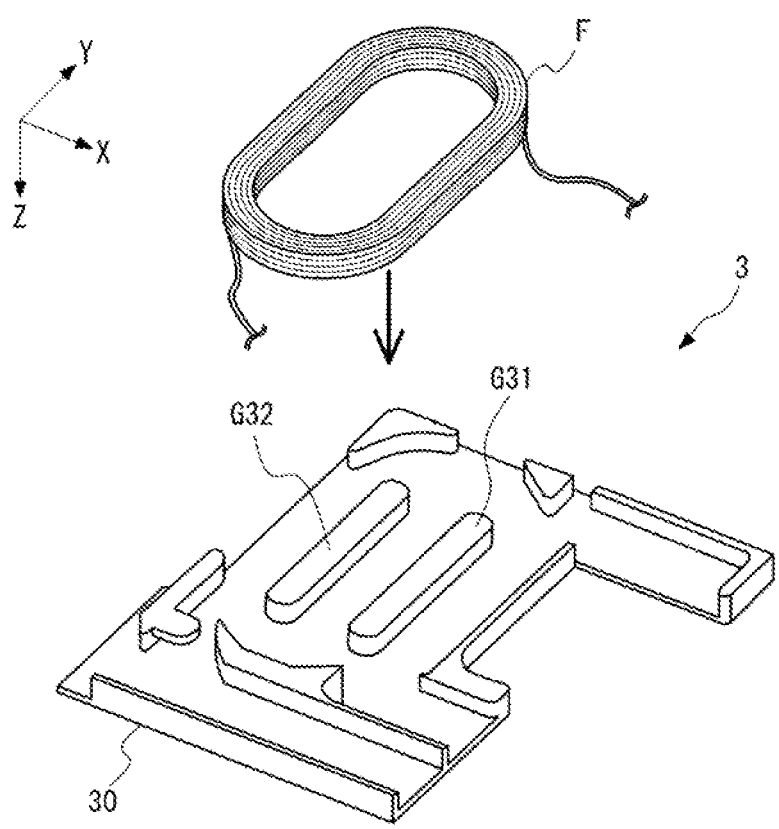
FIG. 4 is a perspective view schematically illustrating a configuration of an optical fiber housing unit.

Next, the configuration of the optical fiber housing unit 3 will be described. FIG. 4 is a perspective view schematically illustrating the configuration of the optical fiber housing unit 3. The optical fiber housing unit 3 is configured as a plate-like member and guides G31 and G32 guiding the optical fibers are disposed on a plate member 30. A longitudinal direction of the guides G31 and G32 is a Y-direction and the guides G31 and G32 are arranged in parallel in an X-direction. The optical fibers are housed in the optical fiber housing unit 3 by bending along the outer perimeters of the guides G31 and G32 or by circling along the outer perimeters.

Figure 5:
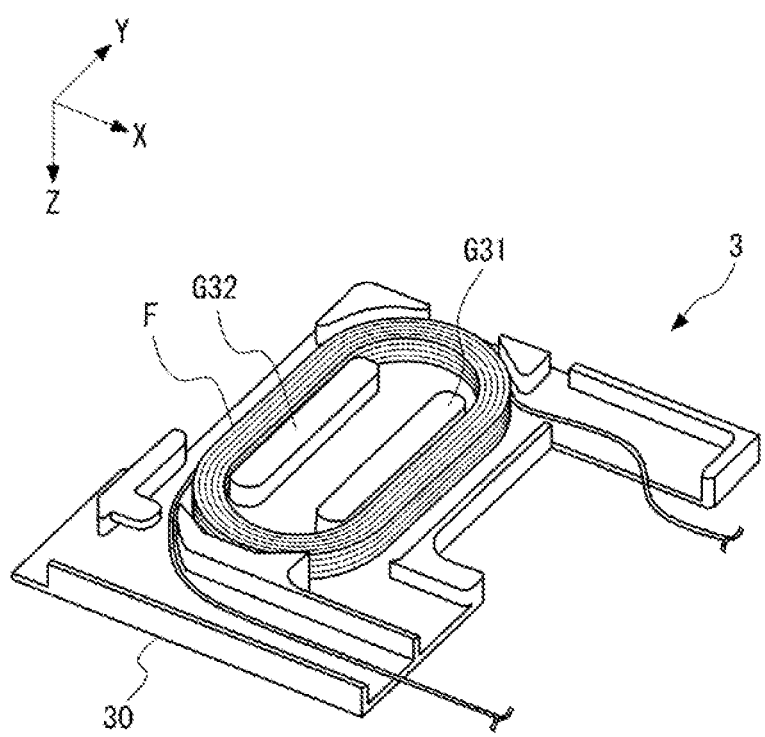
FIG. 5 is a perspective view illustrating a housing mode of the optical fiber in the optical fiber housing unit.

FIG. 5 is a perspective view illustrating a housing mode of the optical fiber in the optical fiber housing unit 3. As illustrated in FIG. 5, an optical fiber F is housed by circling along a path surrounding the guides G31 and G32 one or more times. The illustrated optical fiber F corresponds to the optical fiber F1 described above, or an aggregation of two or more optical fibers including the optical fiber F1, for example. The optical fiber does not need to circle the path surrounding the guides G31 and G32, and may be housed by bending along a part of the path.

The optical fiber F may be wound and housed so as to overlap in a radial direction and an axial direction of circulation. Thus, since the number of the circulation of the optical fiber F can be increased, many optical fibers having the long length can be efficiently housed in in the limited space of the optical fiber housing unit 3.

Figure 6:
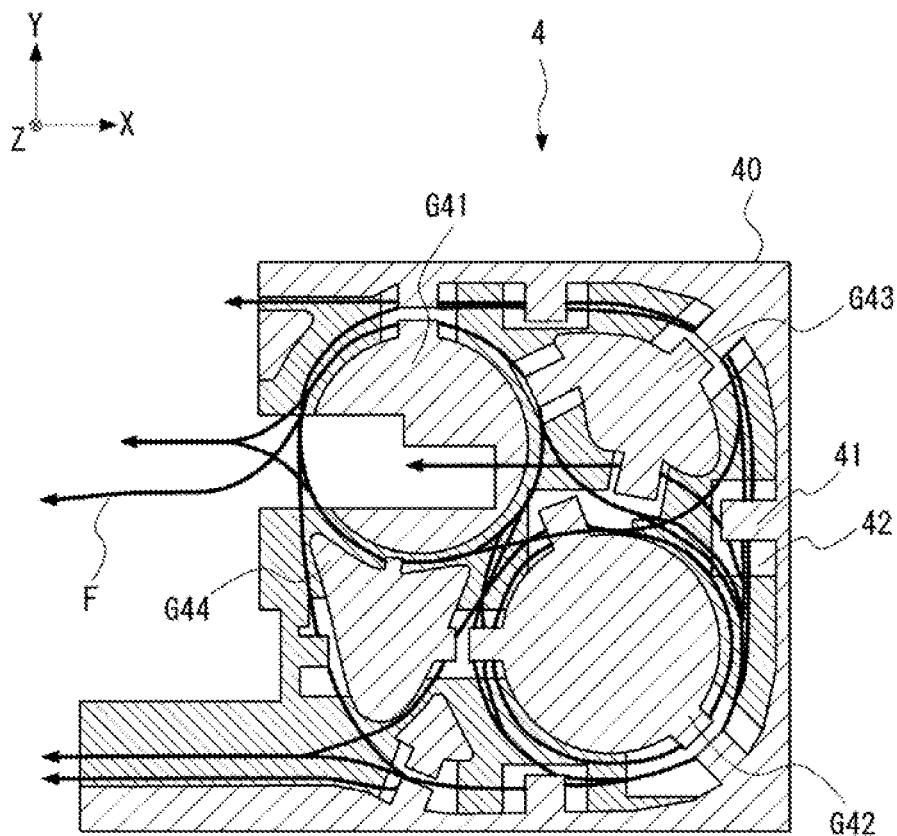
FIG. 6 is a top view schematically illustrating the configuration of the optical fiber housing unit.

Next, the configuration of the optical fiber housing unit 4 will be described. FIG. 6 is a top view schematically illustrating the configuration of the optical fiber housing unit 4. The optical fiber housing unit 4 includes circular guides G41 and G42, and guides G43 and G44 disposed on a plate member 40. The circular guides G41 and G42 are disposed at diagonal positions of a square, respectively. The guides G43 and G44 are disposed at the diagonal positions of the square other than the positions at which the circular guides G41 and G42 are disposed, respectively. The circular guides G41 and G42 can wind up the optical fiber. The optical fiber bends along a curved part of the guides G43 and G44.

As illustrated in FIG. 6, the optical fiber can pass through a path that is from the outer perimeter of the circular guide G41 to the outer perimeter of the circular guide G42 via the curved part of the guide G43 (Needless to say that the optical fiber can pass through this path in the opposite direction). The optical fiber can also pass through a path that is from the outer perimeter of the circular guide G41 to the outer perimeter of the circular guide G42 via the curved part of the guide G44 (Needless to say that the optical fiber can pass through this path in the opposite direction).

The optical fiber F illustrated in FIG. 6 corresponds to the optical fiber F2 described above, or an aggregation of two or more optical fibers including the optical fiber F2, for example. A rough hatching part denotes an upper surface of the guide and a surface of the same height as the upper surface of the guide. A fine hatching part denotes a bottom surface of a concave part that is lower than the upper surface of the guide and on which the optical fiber passes through.

Further, the optical fiber can pass between the circular guide G41 and the guide G43 and extend to the circular guides G41 and G42, and the guide G44 (Needless to say that the optical fiber can pass through this path in the opposite direction). The optical fiber can pass between the circular guide G42 and the guide G43 and to extend to the circular guides G41 and G42, and the guide G44 (Needless to say that the optical fiber can pass through this path in the opposite direction). The optical fiber can pass between the circular guide G41 and the guide G44 and extend to the circular guides G41 and G42, and the guide G43 (Needless to say that the optical fiber can pass through this path in the opposite direction). The optical fiber can pass between the circular guide G42 and the guide G43 to the circular guides G41 and G42, and the guide G43 (Needless to say that the optical fiber can pass through this path in the opposite direction).

The optical fiber housing unit 4 includes projections 41 that project outward from the outer perimeter surfaces of the circular guides G41 and G42, and the guides G43 and G44. The projections 41 projecting inward are also disposed inside an outer frame 40 that is formed to surround the circular guides G41 and G42, and the guides G43 and G44. The projection 41 is configured to allow the optical fiber to pass therebelow. Thus, it is possible to prevent the wound optical fiber from protruding away from the optical fiber housing unit 4 due to bending or twisting. Therefore, it is possible to more robustly house the optical fiber in the optical fiber housing unit 4 and to prevent the optical fiber from being detached from the guide. It should be appreciated that similar projections may be disposed in the optical fiber housing unit 3.

Further, an opening 42 may be disposed under the projection 41. It is desirable that a width W1 of the opening 42 is wider than a width W2 of the projection 41. In this case, since the optical fiber pressed by the projection 41 can be bent downward, housing of the optical fiber is facilitated. Further, even when a distance between the bottom surface of the optical fiber housing unit 4 and the lower surface of the projection 41 is short, it is possible to provide a space through which the optical fiber passes by disposing the opening 42.

The optical fiber may be also configured to be derived downward from the optical fiber housing unit 4 through the opening 42, or to enter into the optical fiber housing unit 4 from the lower side of the optical fiber housing unit 4 through the opening 42 and to be wound around the circular guide. According to this, it is possible to more easily perform optical wiring with respect to components placed under the optical fiber housing unit 4. Therefore, it is possible to increase a degree of freedom of arrangement of the optical fiber housing unit 4 and other components.

As described above, according to the present configuration, it can be understood that the optical fiber used for the optical wiring in the pluggable optical module 100 can be housed without interfering with the other components. Note that, the optical fiber housing units 3 and 4 are made of, for example, resin or metal.

Figure 7:
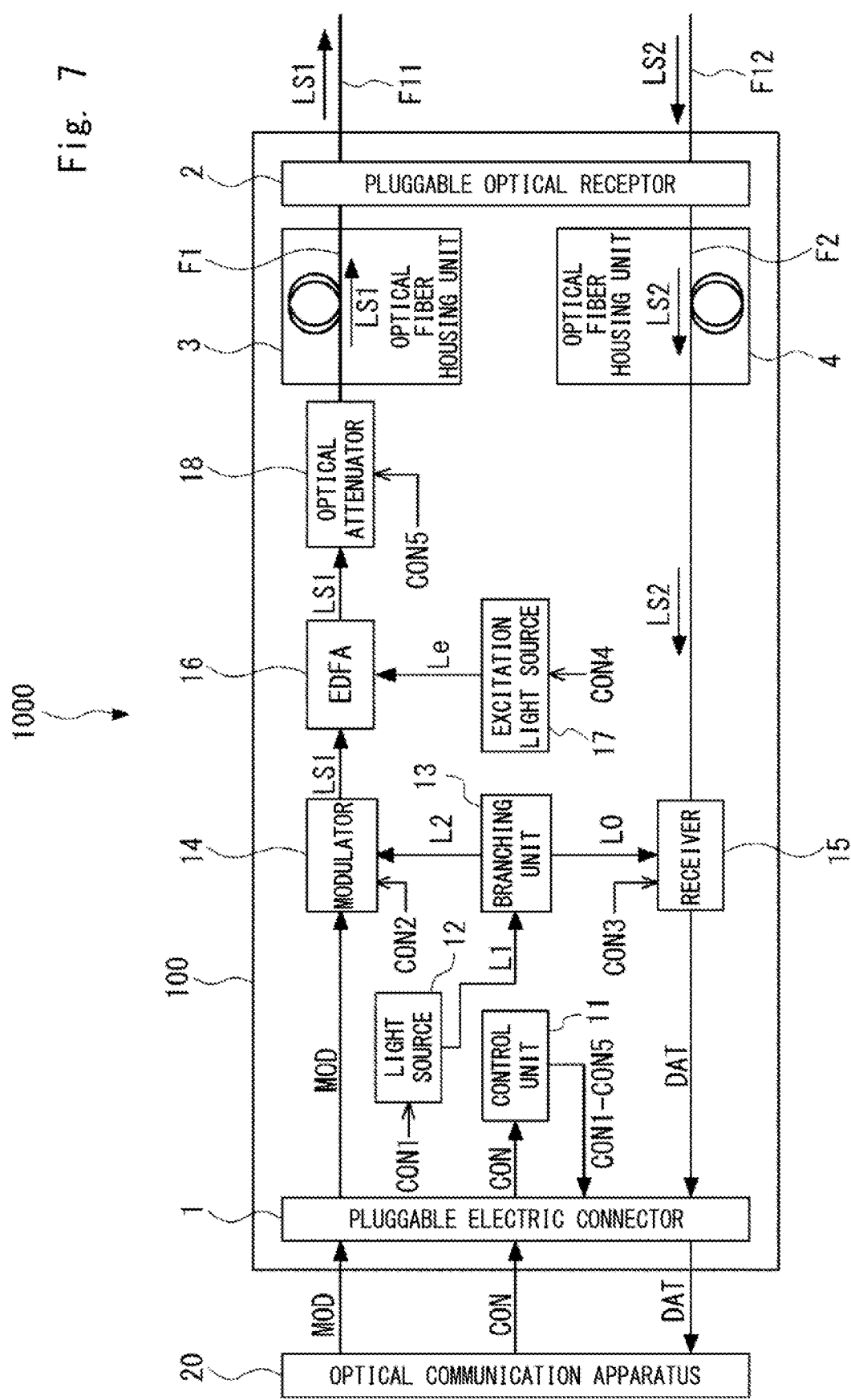
FIG. 7 is a block diagram schematically illustrating a configuration of an optical communication system 1000 according to the first example embodiment.

Next, a basic configuration of the pluggable optical module 100 will be described. FIG. 7 is a block diagram schematically illustrating a configuration of the optical communication system 1000 according to the first example embodiment. As illustrated in FIG. 7, the pluggable optical module 100 is configured to allow connectors disposed at ends of optical fibers F11 and F12 can be inserted into and removed from the pluggable optical module 100. For example, an LC connector and MU connector can be used as the connectors of the optical fibers F11 and F12. The pluggable optical module 100 is controlled based on a control signal CON input from the optical communication apparatus 20 that is a communication host. The pluggable optical module 100 may receive not only the control signal CON but also a modulation signal MOD that is a data signal from the optical communication apparatus 20. In this case, the pluggable optical module 100 may output an optical signal LS1 (also referred to as a first optical signal) modulated based on the received modulation signal MOD through the optical fiber F11. The pluggable optical module 100 may also output a data signal DAT corresponding to an optical signal LS2 (also referred to as a second optical signal) received from the outside through the optical fiber F12 to the optical communication apparatus.

For example, the optical communication apparatus 20 performs communication signal processing such as frame processing of a communication data signal from the pluggable optical module 100 or a communication data signal input to the pluggable optical module 100. The optical communication apparatus 20 is, for example, an optical communication apparatus disposed in a base station. The optical communication apparatus 20 may be a line card inserted into a rack or a box or the like. In this case, the line card includes a receptor for the pluggable optical module 100.

The pluggable optical module 100 includes the pluggable electric connector 1, the pluggable optical receptor 2, the optical fiber housing units 3 and 4, a control unit 11, a light source 12, a branching unit 13, a modulator 14, a receiver 15, an erbium-doped optical Fiber amplifier (EDFA) 16, an excitation light source 17, and an optical attenuator 18.

The pluggable electric connector 1 is configured as an I/O (Input/Output) port capable of being inserted into and removed from the optical communication apparatus 20. The control signal CON that is an electric signal is output to the control unit 11 and the modulation signal MOD that is an electric signal is output to the modulator 14 from the optical communication apparatus 20 through the pluggable electric connector 1. The receiver 15 outputs the data signal DAT to the optical communication apparatus 20 through the pluggable electric connector 1.

The pluggable optical receptor 2 is configured to allow the optical fibers F11 and F12 to be inserted into and removed from the pluggable optical receptor 2. The optical signal LS1 is output to the optical fiber F11 through the pluggable optical receptor 2. The optical signal LS2 propagating through the optical fiber F12 and being input to the pluggable optical module 100 is input to the receiver 15 through the pluggable optical receptor 2. Although the pluggable optical receptor 2 has been described as a single component, it should be appreciated that a pluggable optical receptor which the optical fiber F11 can be inserted into and removed from and a pluggable optical receptor which the optical fiber F12 can be inserted into and removed from may be separately disposed.

The control unit 11 is configured to be capable of controlling an operation of each component in the optical module 100, that is, the light source 12, the modulator 14, the receiver 15, the excitation light source 17, and the optical attenuator 18 in response to the control signal CON. In this example, the control unit 11 generates control signals CON1 to CON5 in response to the control signal CON and outputs the control signals CON1 to CON5 to the light source 12, the modulator 14, the receiver 15, the excitation light source 17, and the optical attenuator 18, for example, through the pluggable electric connector 1, respectively.

The light source 12 is configured as a wavelength-tunable light source that outputs light having a wavelength determined in response to the control signal CON1 (e.g. ITLA: Integrated Tunable Laser Assembly). For example, the light source 12 may be configured as a light source unit including a semiconductor optical amplifier and a wavelength filter.

The branching unit 13 branches a light L1 output from the light source 12 into a light L2 and a local oscillation light LO. Various optical components capable of branching incident light such as a Y-branch, a beam splitter, and a prism may be used as the branching unit 13.

The modulator 14 modulates the light L2 branched by the branching unit 13 based on the modulation signal MOD input from the optical communication apparatus 20 through the pluggable electric connector 1 and outputs the modulated light as the optical signal LS1. The operation of the modulator 14 is controlled based on the control signal CON2 input from the control unit 11. Thus, the modulator 14 can perform an appropriate modulation operation according to the wavelength of the light L2.

The modulator 14 may be configured as a Mach-Zehnder type optical modulator, for example. When the modulator 14 is configured as the Mach-Zehnder type optical modulator, the light L2 can be modulated by applying a signal in response to the modulation signal MOD to phase modulation areas disposed on optical waveguides of the Mach-Zehnder type optical modulator. The modulator 14 can modulate the light L2 with various modulation methods such as phase modulation, amplitude modulation and polarization modulation, or a combination of the various modulation methods. Here, for example, the Mach-Zehnder type optical modulator is a semiconductor optical modulator or another optical modulator.

The above-described phase modulation area is an area that includes an electrode formed on the optical waveguide. An effective refractive index of the optical waveguide below the electrode is changed by applying an electric signal, e.g. a voltage signal, to the electrode on the phase modulation area. As a result, a substantial optical length of the optical waveguide in the phase modulation area can be changed. Thus, a phase of the optical signal propagating through the optical waveguide in the phase modulation area can be changed. In the Mach-Zehnder type optical modulator, a phase difference is caused between the optical signals propagating through two optical waveguides and then the two optical signals are combined. Thus, the combined optical signal can be modulated The receiver 15 is configured, for example, as a receiver (e.g. ICR: Integrated Coherent Receiver) performing digital coherent reception for demodulating a DP-QPSK (Dual-Polarization Quadrature Phase-Shift Keying) optical signal to an electric signal. The receiver 15 demodulates the optical signal LS2 received from the outside through the optical fiber F12 by causing the optical signal LS2 to interfere with the local oscillation light LO. The receiver 15 outputs the data signal DAT that is the demodulated electric signal to the optical communication apparatus 20 through the pluggable electric connector 1. The receiver 15 is controlled by the control signal CON3 output from the control unit 11 and can perform the appropriate demodulation operation according to the wavelength of the optical signal LS2 (or the local oscillation light LO).

The EDFA 16 is a fiber type optical amplifier. The EDFA16 amplifies the optical signal LS1 output from the modulator 14 and outputs the amplified optical signal LS1.

The excitation light source 17 outputs an excitation light Le for exciting the EDFA16 to the EDFA16. The operation of the excitation light source 17 is controlled by the control signal CON4 output from the control unit 11

The optical attenuator 18 (also as referred to as a first optical attenuator) is configured as a variable optical attenuator (VOA) attenuating the optical signal LS1. For example, the variable optical attenuator (VOA) may be achieved by the semiconductor optical amplifier capable of controlling power of an output light by gain control or a shutter physically blocking the light. In other words, the optical attenuator 18 includes various optical components that can function as an optical power adjustment unit capable of controlling or blocking the output light such as the above-described semiconductor optical amplifier and shutter. Thus, the light intensity (optical power) of the optical signal LS1 can be adjusted to a desired value. The operation of the optical attenuator 18 is controlled by the control signal CON5 output from the control unit 11. The optical signal LS1 passing through the optical attenuator 18 is output to the optical fiber F11 through the pluggable optical receptor 2.

The optical fiber housing unit 3 is configured to house the optical fiber F1 connecting between the pluggable optical receptor 2 and the optical attenuator 18. That is, the optical attenuator 18 corresponds to the optical component 5 described above.

The optical fiber housing unit 4 is configured to house the optical fiber F2 connecting between the pluggable optical receptor 2 and receiver 15. That is, the optical attenuator 18 corresponds to the optical component 6 described above.

In general, in the pluggable optical module used for the digital coherent optical communication, not only is it necessary to mount a plurality of optical components in the housing 10, but also miniaturization of dimensions of the pluggable optical module is strongly required as described above. Therefore, it is necessary to house a plurality of optical components in the relatively narrow housing and connect between the components using the optical fiber as appropriate. However, variability due to variation in component mounting positions and in cutting lengths of the optical fibers, it is difficult to prepare the optical fiber having an optimal length for each use application, and the fabrication processes are increased even when this preparation can be achieved. In contrast to this, according to the present configuration, it is possible to connect between the optical components by using the optical fiber having an enough length with respect to a required length and to house the extra length of the optical fiber by the optical fiber housing unit. Thus, the optical wiring using the optical fiber in the pluggable optical module can be easily achieved regardless of the variation in component mounting positions and in cutting lengths of the fibers.

Further, according to the present configuration, since the optical fiber used in the pluggable optical module has the enough length, it is possible to prevent undesired tension from being applied to the optical fiber when laying the optical fiber through the optical fiber housing unit. Thus, since it is possible to prevent the optical fiber from being damaged in the fabrication processes of the pluggable optical module, and it can be understood this is advantageous for improving fabrication yield.

According to the present configuration, since the optical fiber housing unit does not interfere with the other components and does not move from the housed position, it is also possible to prevent the housed optical fiber from contacting the other components and being damaged. Thus, since the optical fiber is not damaged when vibration or shock occurs due to the insertion or removal of the pluggable optical module, it can be understood that it is advantageous to prevent malfunction of the pluggable optical module 100 in operation.

Since the present configuration can house the optical fiber in a circular shape in the plate-like optical fiber housing unit, the thickness of the optical fiber housing unit can be suppressed. Accordingly, it is possible to dispose the optical fiber housing unit in the narrow space in the housing. Therefore, it can be understood that the pluggable optical module is advantageous from the viewpoint of miniaturizing.

Although the example of disposing two optical fiber housing units has been described in the present example embodiment, three or more optical fiber housing units may be disposed. Disposing two or more optical fiber housing units makes it possible to correspond to change of the number or arrangement of the optical components in the housing of the pluggable optical module 100 by only changing the design of a part of the optical fiber housing units. Thus, this is advantageous in that the flexibility with respect to the design change of the pluggable optical module can be ensured and the pluggable optical module can be adapted to various varieties.

For example, even when the arrangement or the number of the optical components is changed due to design change of the pluggable optical module, only the optical fiber housing unit necessary to be changed needs to be replaced, and this leads to suppress the change in the fabrication process.

When the pluggable optical module is adapted to various varieties, it is assumed that there are common parts between the varieties and different parts between the varieties in the arrangement of the optical components. In this case, the common optical fiber housing units may be used to house the optical fibers used for optical interconnection in the common parts, and the optical fiber housing units having the shapes different from each other may be used to house the optical fibers used for optical interconnection in the different parts. Accordingly, since the difference in the processes between the varieties can be minimized, it is possible to achieve the reduction of a lead time and to suppress a fabrication cost.

Additionally, since works of the optical interconnection between the optical components with the housing of the optical fiber in the optical fiber housing unit can be separately performed in parallel for each optical fiber housing unit, it is also possible to reduce the time required for the optical wiring work.

Second Example Embodiment

A pluggable optical module 200 according to a second example embodiment will be described. The pluggable optical module 200 according to the second example embodiment is an alternative example of the pluggable optical module 100 according to the first example embodiment and an optical fiber (EDF) constituting the EDFA 16 is housed in the optical fiber housing unit 3 in the pluggable optical module 200.

Figure 8:
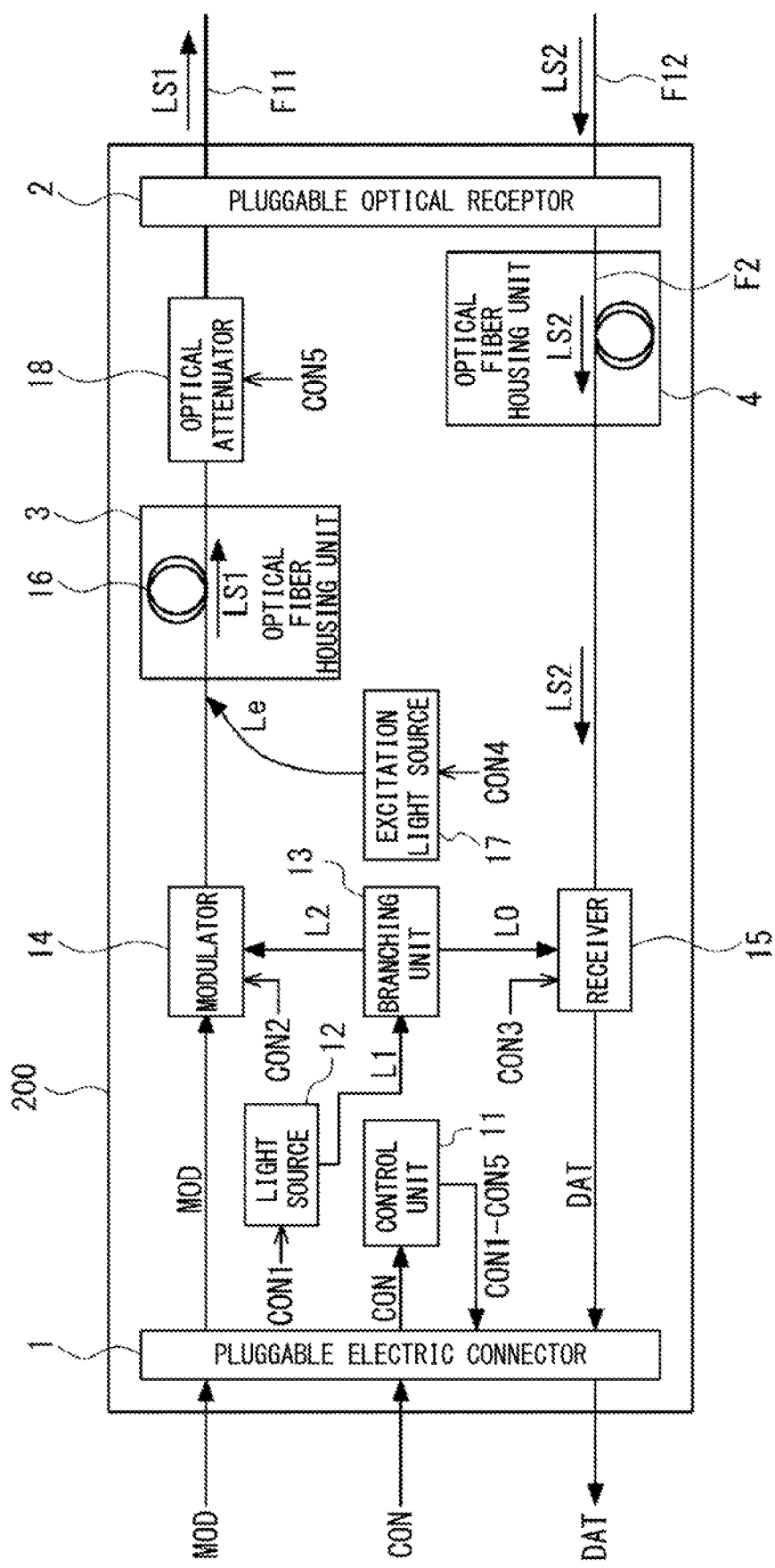
FIG. 8 is a block diagram schematically illustrating a configuration of a pluggable optical module according to a second example embodiment.

FIG. 8 is a block diagram schematically illustrating a configuration of the pluggable optical module 200 according to the second example embodiment. In the pluggable optical module 200, the EDF constituting the EDFA 16 is housed in the optical fiber housing unit 3. Since the other configuration of the pluggable optical module 200 is the same as that of the pluggable optical module 100, the description thereof will be omitted.

As illustrated in FIG. 7, the EDFA may be disposed in the pluggable optical module used for the digital coherent communication to provide the enough optical output of the optical signal LS1 to be output. Therefore, by adding the EDFA and excitation light source for inputting the excitation light to the EDFA, the mounting density of the optical component in the housing of the pluggable optical module is more densified. Further, the EDFA generally has the EDF whose length is from several meters to several tens of meters. Therefore, it is necessary to house the long-length EDF in the housing in the pluggable optical module without interfering with the optical components or the like.

Meanwhile, according to the present configuration, by circling the EDF two or more times in the optical fiber housing unit 3, the EDF can be compactly housed in the optical fiber housing unit 3. In this case, the EDF can be easily housed by winding up the EDF with a predetermined dimension and a predetermined shape, and inserting the wound EDF into the optical fiber housing unit. Thus, even when using the EDFA, it can be understood that the EDFA can be compactly housed in the pluggable optical module while preventing the EDF constituting the EDFA from being damaged.

Third Example Embodiment

A pluggable optical module 300 according to a third example embodiment will be described. The pluggable optical module 300 has a configuration in which the optical fiber housing unit 3 of the pluggable optical module 200 according to the second example embodiment is replaced with an optical fiber housing unit 8. The optical fiber housing unit 8 will be described below.

Figure 9:
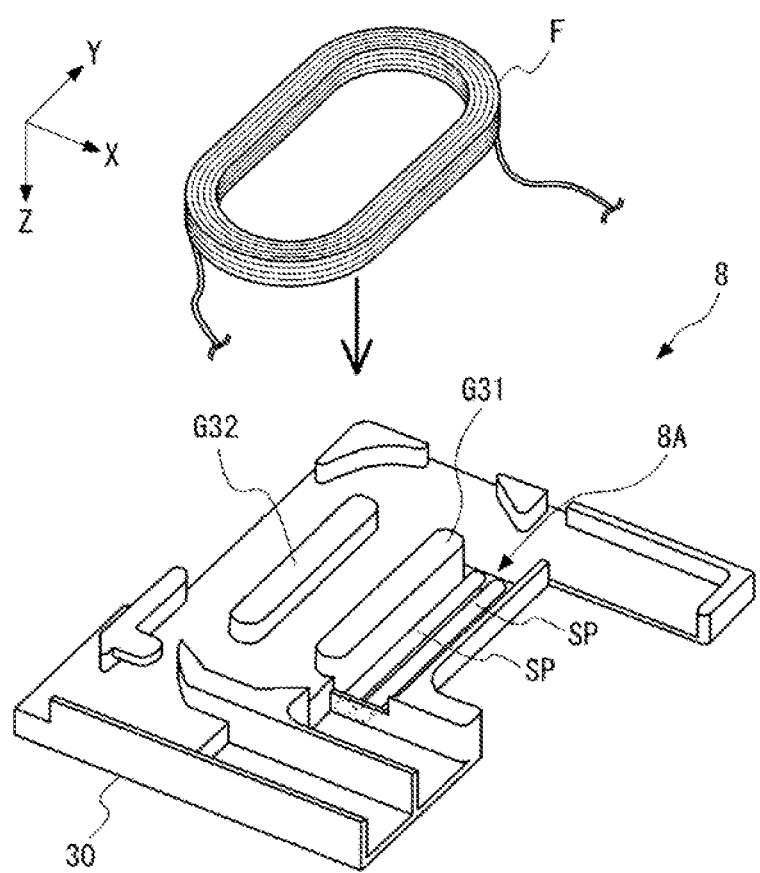
FIG. 9 is a perspective view schematically illustrating a configuration of an optical fiber housing unit according to a third example embodiment.
Figure 10:
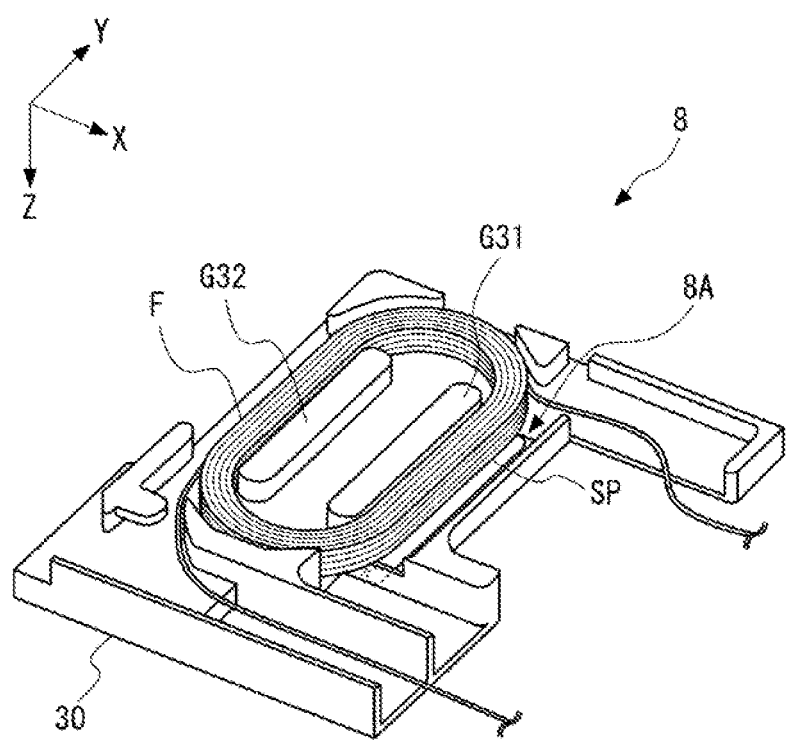
FIG. 10 is a perspective view illustrating a housing mode of the optical fiber in the optical fiber housing unit according to the third example embodiment.

FIG. 9 is a perspective view schematically illustrating a configuration of the optical fiber housing unit 8 according to the third example embodiment. The optical fiber housing unit 8 has a configuration in which a splice housing 8A is added to the optical fiber housing unit 3. FIG. 10 is a perspective view illustrating a housing mode of the optical fiber in the optical fiber housing unit 8 according to the third example embodiment. In the present example embodiment, the splice housing 8A is disposed below a space for housing the optical fiber F.

In the optical fiber F, a splice SP is disposed at a joint of two optical fibers. In general, the splice SP is reinforced by covering the joint of two optical fibers with a reinforcing sleeve. In the splice housing 8A, a groove into which the sleeve of the splice SP is inserted is disposed, for example. As illustrated in FIGS. 9 and 10, the splice SP can be fixed by inserting the splice SP into the groove extending along the Y-direction.

In general, the mechanical strength with respect to tension and bending of the joint in the splice is generally lower than that of other parts in the optical fiber having the splice. Therefore, in the present configuration, by fixing the splice SP by the splice housing 8A, movement of the splice SP when a force is applied to the optical fiber can be prevented, and the burden of the joint of the optical fiber can be decreased. As a result, when the force is applied to the optical fiber while disposing the optical fibers and mounting the optical fiber housing unit, it is possible to prevent the optical fiber from being broken.

The splice protects of the joint of the optical fiber over a predetermined length. Accordingly, the splice housing needs to have the length enough to house the splice. The optical fiber housing unit 8 according to the present example embodiment has an area in an X-Y plane for housing the optical fiber F circling two or more times with a curvature equal to or more than a predetermined curvature. According to this, by disposing the splice housing 8A in such a manner that the optical fiber F and the splice SP are stacked in the axis direction (Z-direction) of the circling of the optical fiber F, the splice can be housed without increasing the area in the X-Y plane of the optical fiber housing unit 8. Therefore, according to the present configuration, the splice can be housed while achieving the miniaturization of the pluggable optical module.

The Y-direction is the direction in which the splice housing 8A extends, or the longitudinal direction of the splice housing 8A as described above. However, the longitudinal direction of the splice housing 8A may be the X-direction, or may be any direction parallel to the X-Y plane (i.e. a direction parallel to a plane normal to the axis direction of the circling of the optical fibers F). A plurality of the splice housings having the same or different longitudinal direction may be disposed. Any number of the splices may be housed in the splice housing as long as the splice housing can accept those.

Figure 11:
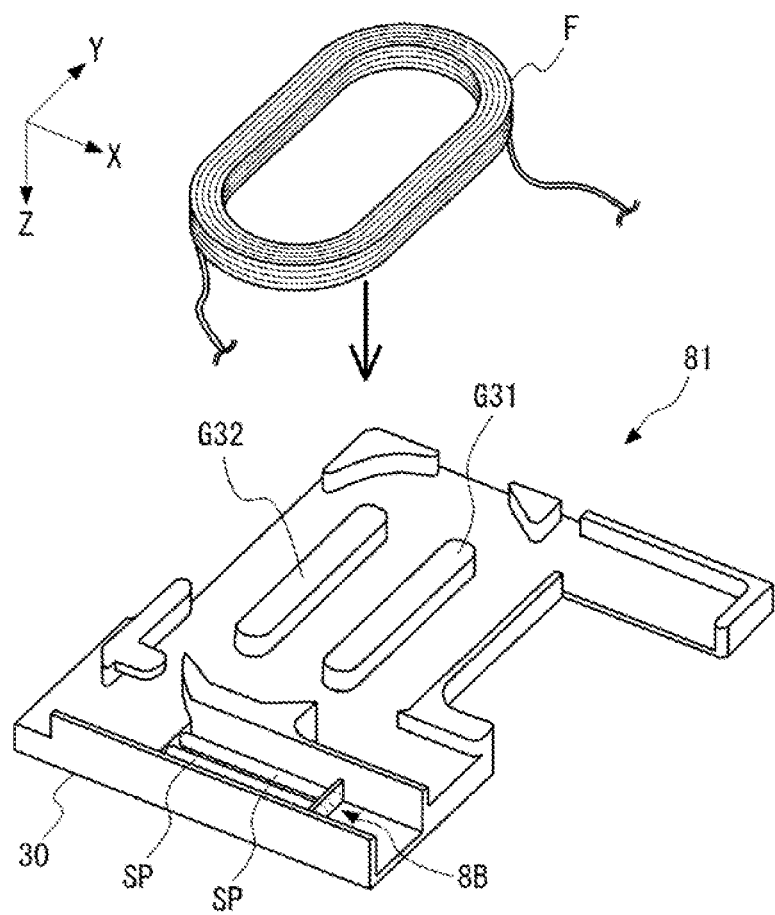
FIG. 11 is a perspective view schematically illustrating an alternative example of the optical fiber housing unit.

An example of an arrangement of the splice housings will be described below. FIG. 11 is a perspective view schematically illustrating a configuration of an optical fiber housing unit 81 that is an alternative example of the optical fiber housing unit 8. In the optical fiber housing unit 8, the splice housing 8A extends in the Y-direction, and the splice SP whose longitudinal direction is the Y-direction is housed in the optical fiber housing unit 8. In contrast to this, the optical fiber housing unit 81 in FIG. 11, a splice housing 8B extending in the X-direction is disposed to be stacked in the axis direction of the circling of the optical fiber F (Z-direction) instead of the splice housing 8A. Additionally, the splice SP whose longitudinal direction is the X-direction is housed in the optical fiber housing unit 81. Therefore, even when the longitudinal direction of the splice housing is the X-direction, the splice can be housed without increasing the area of the optical fiber housing unit 81 in the X-Y plane as in the examples of FIGS. 9 and 10.

Figure 12:
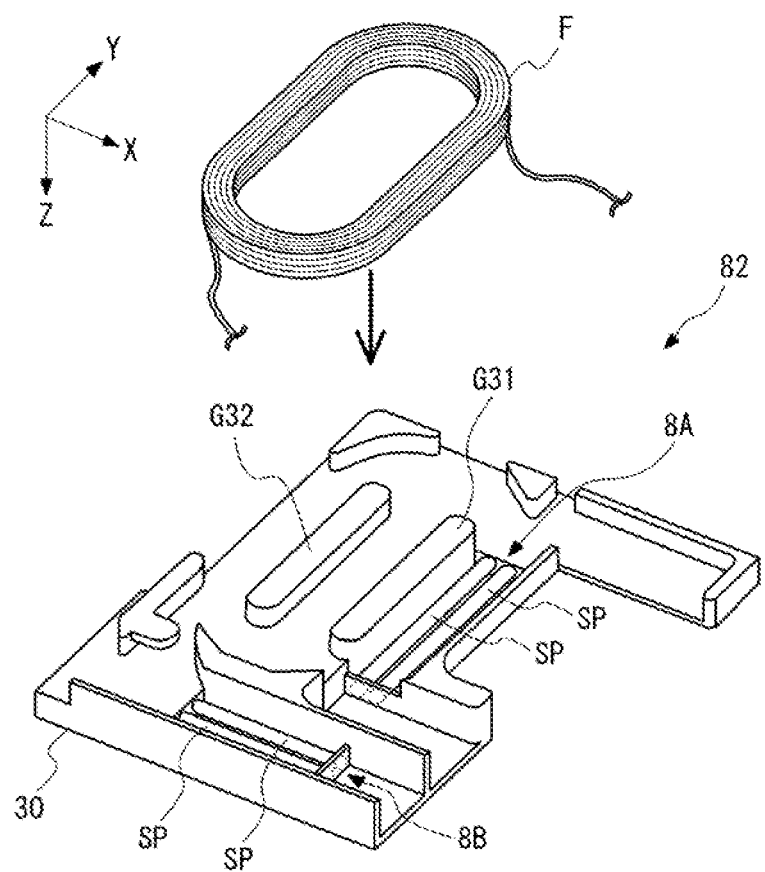
FIG. 12 is a perspective view schematically illustrating an alternative example of the optical fiber housing unit.

FIG. 12 is a perspective view schematically illustrating a configuration of an optical fiber housing unit 82 that is an alternative example of the optical fiber housing unit 8. As illustrated in FIG. 12, in the optical fiber housing unit 82, the splice housing 8A illustrated in FIGS. 9 and 10, and the splice housing 8B illustrated in FIG. 11 are disposed to be stacked in the axis direction of the circling of the optical fiber F (Z-direction). Therefore, more splices can be housed without increasing the area of the optical fiber housing unit 82 in the X-Y plane.

Although the splice has been described to be housed in the splice housing in the above description, the joint of the optical fiber, for example, jointed with other joint methods such as a connector may be housed. In other words, the joint of the optical fiber jointed with any joint method can be housed in the housing for the joint including the splice housing, Although it has been further described that the splice housing 8A is disposed in the optical fiber housing unit 8 in the present example embodiment, the same splice housing may be disposed in other optical fiber housing units including the optical fiber housing unit 4.

Fourth Example Embodiment

A pluggable optical module 400 according to a fourth example embodiment will be described. The pluggable optical module 400 according to the fourth example embodiment is an alternative example of the pluggable optical module 100 according to the first example embodiment and a configuration for guiding the optical fiber in the housing 10 is added in addition to the optical fiber housing units 3 and 4.

Figure 13:
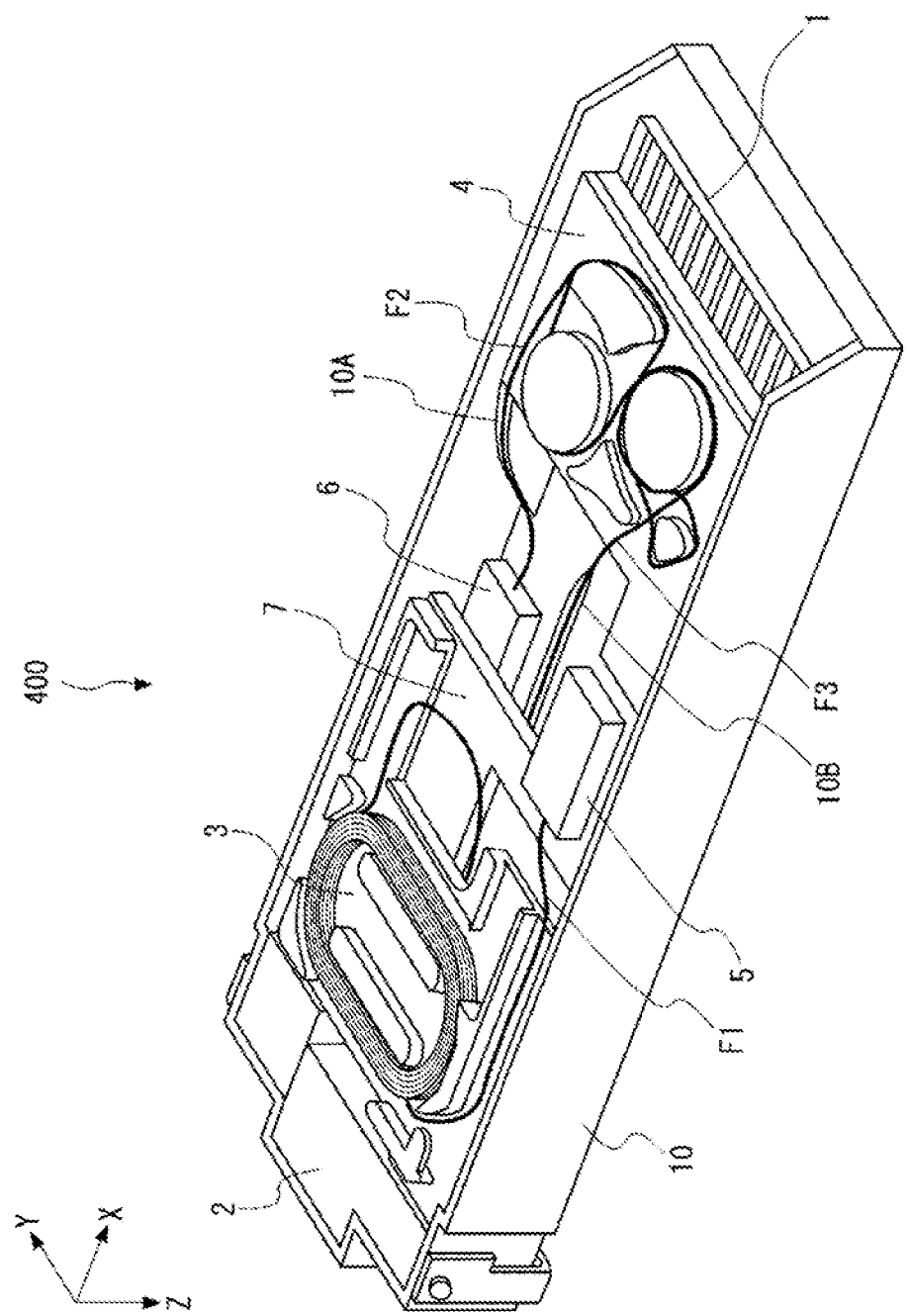
FIG. 13 is a block diagram schematically illustrating an internal structure of a pluggable optical module according to a fourth example embodiment.

FIG. 13 is a block diagram schematically illustrating an internal structure of the pluggable optical module 400 according to the fourth example embodiment. As illustrated in FIG. 13, the optical component 6 is disposed in the upper side (Z+ side) in the housing 10 in the pluggable optical module 400. The optical fiber F2 connecting between the optical component 6 and the optical fiber housing unit 4 is laid along a groove disposed on a slope of a guiding jig 10A fixed to the housing 10. Thus, the optical fiber connecting between the optical component 6 and the optical fiber housing unit 4 disposed with a height difference in the vertical direction (Z-direction) can be guided while being bent with a curvature within a predetermined range. Since the optical fiber F2 is fixed by the groove of the guiding jig 10A, it is possible to prevent the optical fiber F2 from being damaged by interfering with other optical components or the like.

Further, in the upper side (Z+ side) in the housing 10, a groove 10B for guiding the optical fiber F3 extending from the optical fiber housing unit 4 is disposed. Note that the groove 10B is an example of the guide jig as the guiding jig 10A. Thus, the optical fiber F3 can be guided while being bent with the curvature within the predetermined range. Since the optical fiber F3 is fixed by the groove 10B, it is possible to prevent the optical fiber F3 from being damaged by interfering with other optical components or the like.

The guiding jig 10A may be configured as a member physically separated from the housing 10 that can be fixed to the housing 10. The guiding jig 10A may be also configured as a part of the housing 10. The groove 10B may be formed on the housing 10 and may be as a groove formed on a member physically separated from the housing 10 that can be fixed to the housing 10. Further, the guiding jig 10A and the guiding jig on which the groove 10B is formed may be configured to be fixable to one or both of the optical fiber housing units 3 and 4.

Although one guiding jig 10A and one groove 10B are disposed in the above description, two or more arbitrary guiding jigs may be provided, and two or more grooves may be provided. In the case of disposing two or more guiding jigs, the curvatures of the guided optical fibers may be the same or be different. In the case of disposing two or more grooves, the curvatures of the guided optical fibers may be the same or be different.

Additionally, it should be appreciated that a structure similar to the guiding jig 10A and a structure similar to the groove 10B may be disposed in other components such as the optical fiber housing units 3 and 4, and the printed circuit board 7.

Figure 14:
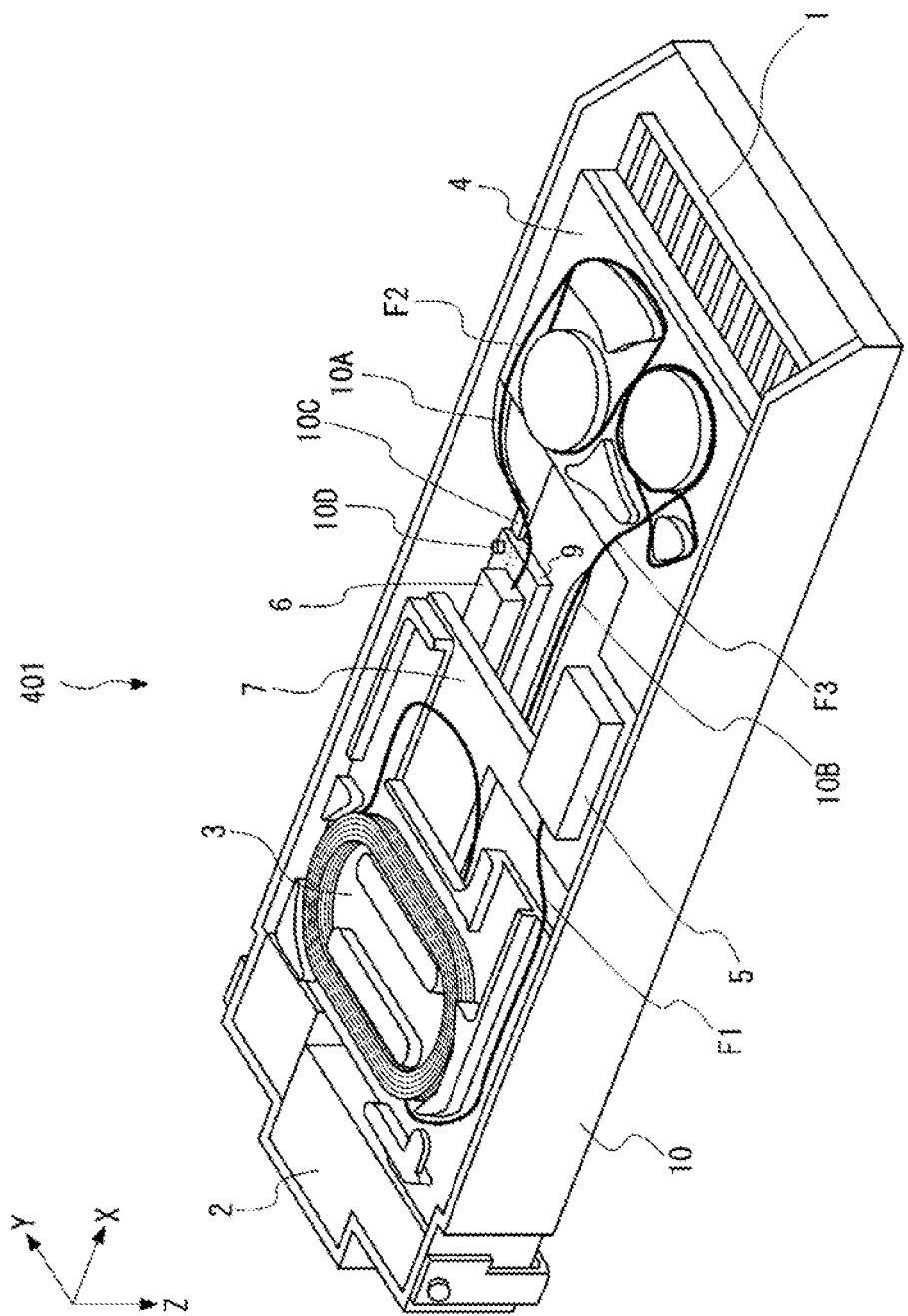
FIG. 14 is a perspective view schematically illustrating an internal structure of an alternative example of the pluggable optical module according to the fourth example embodiment.

Next, an alternative example of the pluggable optical module 400 will be described. FIG. 14 is a perspective view schematically illustrating an internal structure of a pluggable optical module 401 that is the alternative example of the pluggable optical module 400 according to the fourth example embodiment. In the pluggable optical module 401, the optical component 6 is mounted on a mounting jig 9.

The mounting jig 9 on which the optical component 6 is mounted is configured to allow a part thereof to fit into the guiding jig. Specifically, a projection 10C extending from the guiding jig 10A to the mounting jig 9 in the X-direction is provided with a pin 10D extending in the Z-direction. The mounting jig 9 is provided with a hole through which the pin 10D can be inserted. By inserting the pin 10D through the hole of the mounting jig 9, the relative position between the mounting jig 9 and the guiding jig 10A is fixed.

Accordingly, since the optical fiber F2 connecting between the optical component 6 and the optical fiber housing unit 4 are fixed, it is possible to more robustly prevent the optical fiber F2 from being damaged by interfering with other optical components or the like.

Other Example Embodiments

The present invention is not limited to the above-described exemplary embodiments, and can be modified as appropriate without departing from the scope of the invention. For example, it is desirable that the optical fiber housing unit is formed of a material having high thermal conductivity. In this case, since it is possible to contribute to heat dissipation of other components mounted in the vicinity of the optical fiber housing unit and the printed circuit board, it is possible to improve heat radiation performance. Therefore, thermal runaway of a circuit can be suppressed.

In the drawings referred in the above-described example embodiments, the transmission of the signal between the components in the pluggable optical module and between the components disposed in the optical communication system (the pluggable optical module and the optical communication apparatus) is indicated by the arrow line. However, this indication does not mean that the signal is transmitted in a single direction between two components. It should be appreciated that the signal can be bi-directionally communicated between the two components as appropriate.

In the above-described example embodiments, an isolator may be inserted between the modulator and the EDFA to prevent a return light to the modulator.

Although it has been described that the branching unit 13 is separated from the light source 12, the modulator 14, and the receiver 15, it is merely an example. For example, the branching unit 13 may be incorporated in the light source 12. The branching unit 13 may be also incorporated in the modulator 14. In this case, the light L1 is input to the modulator 14 and branched by the branching unit 13 in the modulator 14, and the branched local oscillation light LO is input to the receiver 15. Further, the branching unit 13 may be also incorporated in the receiver 15. In this case, the light L1 is input to the receiver 15 and branched by the branching unit 13 in the receiver 15, and the branched light L2 is input to the modulator 14.

In the above-described example embodiments, the example in which the control unit 11 controls the light source, the optical modulator, the receiver, the excitation light source, and the optical attenuator in response to the control signal CON from the optical communication apparatus 93 has been described. However, the control unit 11 may autonomously control the light source, the optical modulator, the receiver, the excitation light source, and the optical attenuator regardless of the control signal from the outside.

In the above-described example embodiments, the communication of the control signal through the pluggable electric connector 1 can be achieved by applying technologies such as MDIO (Management Data Input/Output) or an I2C (Inter-Integrated Circuit).

In the above-described example embodiments, although it is described that the receiver 15 receives the DP-QPSK optical signal, it is merely an example. For example, the receiver 15 may be configured to be capable of receiving other modulation signal such as QAM (Quadrature Amplitude Modulation).

In the above-described example embodiments, although it has been described that the light source 12 includes the semiconductor optical amplifier and the wavelength filter, other configurations can be adopted as long as these can function as a wavelength-tunable light source. For example, the light source 12 may include a DFB (Distributed Feed-Back) laser array and a selection unit that selects a laser light among laser lights output from a plurality of DFB lasers included in the DFB laser array. Further, instead of the DFB (Distributed FeedBack) laser array, a laser array including another type of laser such as a DBR (Distributed Bragg Reflector) laser may be used.

The present invention has been described above with reference to the exemplary embodiments, but the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2017-164625, filed on Aug. 29, 2017, the disclosure of which is incorporated herein in its entirety by reference.

REFERENCE SIGNS LIST

CON, CON1-CON5 CONTROL SIGNALS
DAT DATA SIGNAL
F, F1-F3, F11, F12 OPTICAL FIBERS
G31, G32, G43, G44 GUIDES
G41, G42 CIRCULAR GUIDES
L1, L2 LIGHTS
LO LOCAL OSCILLATION LIGHT
LS1, LS2 OPTICAL SIGNALS
LE EXCITATION LIGHT
MOD MODULATION SIGNAL
SP SPLICE
1 PLUGGABLE ELECTRIC CONNECTOR
2 PLUGGABLE OPTICAL RECEPTOR
3, 4, 8, 81, 82 OPTICAL FIBER HOUSING UNIT
5, 6 OPTICAL COMPONENTS
7 PRINTED CIRCUIT BOARD
8A, 8B SPLICE HOUSING UNITS
9 MOUNTING UNIT
10 HOSING
10A GUIDING JIG
10B GROOVE
10C PROJECTION
10D PIN
11 CONTROL UNIT
12 LIGHT SOURCE
13 BRANCHING UNIT
14 MODULATOR
15 RECEIVER
16 EDFA
17 EXCITATION LIGHT SOURCE
18 OPTICAL ATTENUATOR
20 OPTICAL COMMUNICATION APPARATUS
30, 40 PLATE MEMBERS
41 PROJECTIONS
42 OPENING
100, 200, 300, 400 PLUGGABLE OPTICAL MODULE

The invention claimed is:
1. A pluggable optical module comprising:
a first optical fiber housing unit configured to be capable of housing a first optical fiber connected to a first optical component;
a second optical fiber housing unit configured to be capable of housing a second optical fiber connected to a second optical component; and
a housing comprising a housing structure capable of housing the first optical fiber housing unit and the second optical fiber housing unit, wherein
the pluggable optical module is configured to be capable of being inserted into and removed from an optical communication apparatus and the housing constitutes an outer shape of the pluggable optical module,
the first optical fiber housing unit and the second optical fiber housing unit are configured in such a manner that the housed optical fiber is housed by being bent along a predetermined path, and
the first optical fiber housing unit and the second optical fiber housing unit are configured in such a manner that the housed optical fiber is housed by circling once or more along the predetermined path.

2. The pluggable optical module according to claim 1, wherein one or both of the first optical fiber housing unit and the second optical fiber housing unit are an optical fiber housing unit configured to house an extra length of a housed optical fiber.

3. The pluggable optical module according to claim 2, wherein one or both of the first optical fiber housing unit and the second optical fiber housing unit contact with the housing and the contacted part is fixed to the housing.

4. The pluggable optical module according to claim 2, wherein the first optical fiber housing unit and the second optical fiber housing unit comprise a splice housing that houses a splice provided to the housed optical fiber.

5. The pluggable optical module according to claim 4, wherein
the splice housing is disposed to overlap with the housed optical fiber in an axis direction of the circling.

6. The pluggable optical module according to claim 4, wherein the splice housing is configured to extend in a direction parallel to a plane normal to the axis direction of the circling of the housed optical fiber.

7. The pluggable optical module according to claim 2, wherein one or both of the optical fiber housed in the first optical fiber housing unit and the optical fiber housed in the second optical fiber housing unit are an optical fiber constituting an EDFA.

8. The pluggable optical module according to claim 1, further comprising a guiding jig guiding the optical fiber laid in the housing.

9. The pluggable optical module according to claim 8, wherein the guiding jig is configured to be capable of being physically fixed to one or both of the first optical fiber housing unit and the second optical fiber housing unit.

10. The pluggable optical module according to claim 8, wherein the guiding jig is configured as a member physically separated from the housing, the guiding jig capable of being fixed to the housing, or integrally configured with the housing as a part of the housing.

11. The pluggable optical module according to claim 1, wherein the first optical fiber housing unit and the second optical fiber housing unit are disposed in such a manner that planes thereof on which the optical fibers are housed do not face optical components disposed in the housing.

12. An optical communication system comprising:
a pluggable optical module configured to allow an optical fiber to be inserted thereinto or removed therefrom and configured to be capable of transmitting and receiving an optical signal through the optical fiber; and
an optical communication apparatus configured to allow the pluggable optical module to be inserted thereinto or removed therefrom, wherein
the pluggable optical module comprises:
a first optical fiber housing unit configured to be capable of housing a first optical fiber connected to a first optical component;
a second optical fiber housing unit configured to be capable of housing a second optical fiber connected to a second optical component; and
a housing comprising a housing structure capable of housing the first optical fiber housing unit and the second optical fiber housing unit, wherein
the housing constitutes an outer shape of the pluggable optical module,
the first optical fiber housing unit and the second optical fiber housing unit are configured in such a manner that the housed optical fiber is housed by being bent along a predetermined path, and
the first optical fiber housing unit and the second optical fiber housing unit are configured in such a manner that the housed optical fiber is housed by circling once or more along the predetermined path.

13. The optical communication system according to claim 12, wherein one or both of the first optical fiber housing unit and the second optical fiber housing unit are an optical fiber housing unit configured to house an extra length of a housed optical fiber.

14. The optical communication system according to claim 13, wherein one or both of the first optical fiber housing unit and the second optical fiber housing unit contact with the housing and the contacted part is fixed to the housing.

15. The optical communication system according to claim 13, wherein the first optical fiber housing unit and the second optical fiber housing unit comprise a splice housing that houses a splice provided to the housed optical fiber.

16. The optical communication system according to claim 15, wherein
the splice housing is disposed to overlap with the housed optical fiber in an axis direction of the circling.

* * * * *